United States Patent
Tsai et al.

(10) Patent No.: US 9,425,964 B2
(45) Date of Patent: Aug. 23, 2016

(54) DISPLAY DEVICE WITH MOBILE HIGH-DEFINITION LINK PORT AND SIGNAL PROCESSING METHOD THEREOF

(71) Applicant: MStar Semiconductor, Inc., Hsinchu Hsien (TW)

(72) Inventors: Meng-Che Tsai, Zhubei (TW); Yu-Cheng Kuo, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 9 days.

(21) Appl. No.: 14/295,501

(22) Filed: Jun. 4, 2014

(65) Prior Publication Data

US 2014/0359308 A1    Dec. 4, 2014

Related U.S. Application Data

(60) Provisional application No. 61/830,646, filed on Jun. 4, 2013.

(51) Int. Cl.

| | |
|---|---|
| G06F 21/00 | (2013.01) |
| H04L 9/32 | (2006.01) |
| H04L 9/14 | (2006.01) |
| G06F 21/85 | (2013.01) |
| G06F 3/048 | (2013.01) |
| H04L 29/06 | (2006.01) |
| H04M 1/725 | (2006.01) |

(52) U.S. Cl.
CPC .............. *H04L 9/3226* (2013.01); *G06F 3/048* (2013.01); *G06F 21/85* (2013.01); *H04L 9/14* (2013.01); *H04L 63/0869* (2013.01); *H04L 63/0435* (2013.01); *H04L 2209/80* (2013.01); *H04M 1/72527* (2013.01)

(58) Field of Classification Search
CPC .............................. H04L 9/32; H04L 2209/60
See application file for complete search history.

(56) References Cited

U.S. PATENT DOCUMENTS

| | | | |
|---|---|---|---|
| 2012/0020475 A1* | 1/2012 | Altmann | .......................... 380/42 |
| 2012/0023331 A1* | 1/2012 | Altmann | .......... H04N 21/43635 713/168 |
| 2013/0089202 A1* | 4/2013 | Altmann | ....................... 380/211 |
| 2013/0152149 A1* | 6/2013 | Park et al. | ...................... 725/114 |
| 2013/0279693 A1* | 10/2013 | Rothschild | .................... 380/200 |

FOREIGN PATENT DOCUMENTS

TW         201212638 A        3/2012

OTHER PUBLICATIONS

Taiwan Office Action, Aug. 18, 2015, 5 pages.

* cited by examiner

*Primary Examiner* — Brandon Hoffman
*Assistant Examiner* — Helai Salehi
(74) *Attorney, Agent, or Firm* — Edell, Shapiro & Finnan, LLC

(57) ABSTRACT

A signal processing method for a display device is provided. The display device is capable of connecting a portable consumer electronic device via a high-definition link (MHL) port. Via the communication bus (CBUS) in the MHL port, a set of encryption codes is provided to the portable consumer electronic device. Based on an encrypted identification fed back from the portable consumer electronic device, it is determined whether the portable consumer electronic device passes authentication. If the portable consumer electronic device passes the authentication, when a human interface device provides a user command to the display device, the user command is encrypted according to the set of encryption codes to generate an encrypted user command compliant to the CBUS specification. Via the CBUS of the MHL port, the encrypted user command is provided to the portable consumer electronic device.

10 Claims, 4 Drawing Sheets

DISPLAY DEVICE WITH MOBILE HIGH-DEFINITION LINK PORT AND SIGNAL PROCESSING METHOD THEREOF

This application claims the benefit of U.S. provisional application Ser. No. 61/830,646, filed Jun. 4, 2013, the subject matter of which is incorporated herein by reference.

BACKGROUND OF THE INVENTION

1. Field of the Invention

The invention relates in general to a display device, and more particularly, to a display device with a mobile high-definition link (MHL) port.

2. Description of the Related Art

In the recent years, accompanied with thriving electronic technologies, portable consumer electronic devices such as mobile phones and tablet computers are becoming more and more popular. As portable consumer electronic devices must be compact in size for better portability, screen sizes of such portable consumer electronic devices are quite limited. In response to the demand of transferring an image of a portable consumer electronic device to and playing the same on a display device having a larger size, a transmission specification such as mobile high-definition link (MHL) for transmission between the two above devices is developed. One setback of the current MHL is that, while transmitting image data between a portable consumer electronic device and a display device, other types of data or commands cannot be transmitted between the two. As a result, a user is restricted to control the portable consumer electronic device only via an input interface (e.g., a touch screen) of the portable consumer electronic device.

SUMMARY OF THE INVENTION

The invention is directed to a display device and a signal processing device for a display device to solve the above issues. Via a communication bus (CBUS) in an MHL interface, the display device and the signal processing method of the present invention are capable of sending a user command generated by a human interface device (HID) to a portable consumer electronic device, so as to control the portable consumer electronic device via the HID. Further, in the display device and the signal processing method of the present invention, the user command generated by the HID is applied with an appropriate encryption procedure, so as to prevent a function of "communicating with an HID via a display device" provided by the display device from being utilized by a portable consumer electronic device that is not in a partnership with the display device.

According to an embodiment of the present invention, a signal processing method for a display device is provided. The display device is feasible to connect to an HID, or to a portable consumer electronic device via an MHL port. A set of encryption codes is provided to the portable consumer electronic device via a communication bus (CBUS) in the MHL port. According to an encrypted identification fed back from the portable consumer electronic device, it is determined whether the portable consumer electronic device passes authentication. The encrypted identification is generated by the portable consumer electronic device according to the set of encryption codes. If the portable consumer electronic device passes the authentication, when the HMI device provides a user command to the display device, the user command is encrypted according to the set of encryption codes to generate an encrypted user command compliant to a CBUS specification. Via the CBUS in the MHL port, the encrypted user command is provided to the portable consumer electronic device.

According to another embodiment of the present invention, a display device is provided. The display device includes an HID port, an MHL port and a controller. The HID port is feasible to connect to an HID. The MHL port is feasible to connect to a portable consumer electronic device. The controller generates a set of encryption codes, and provides the set of encryption codes to portable consumer electronic device via a CBUS in the MHL port. After receiving an encrypted identification fed back from the portable consumer electronic device, the controller determines whether the portable consumer electronic device passes authentication according to the encrypted identification. The encrypted identification is generated by the portable consumer electronic device according to the set of encryption codes. If the portable consumer electronic device passes the authentication, when the HID provides a user command to the display device, the controller encrypts the user command according to the set of encryption codes to generate an encrypted user command compliant to a CBUS specification, and provides the encrypted user command to the portable consumer electronic device via the CBUS in the MHL port.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
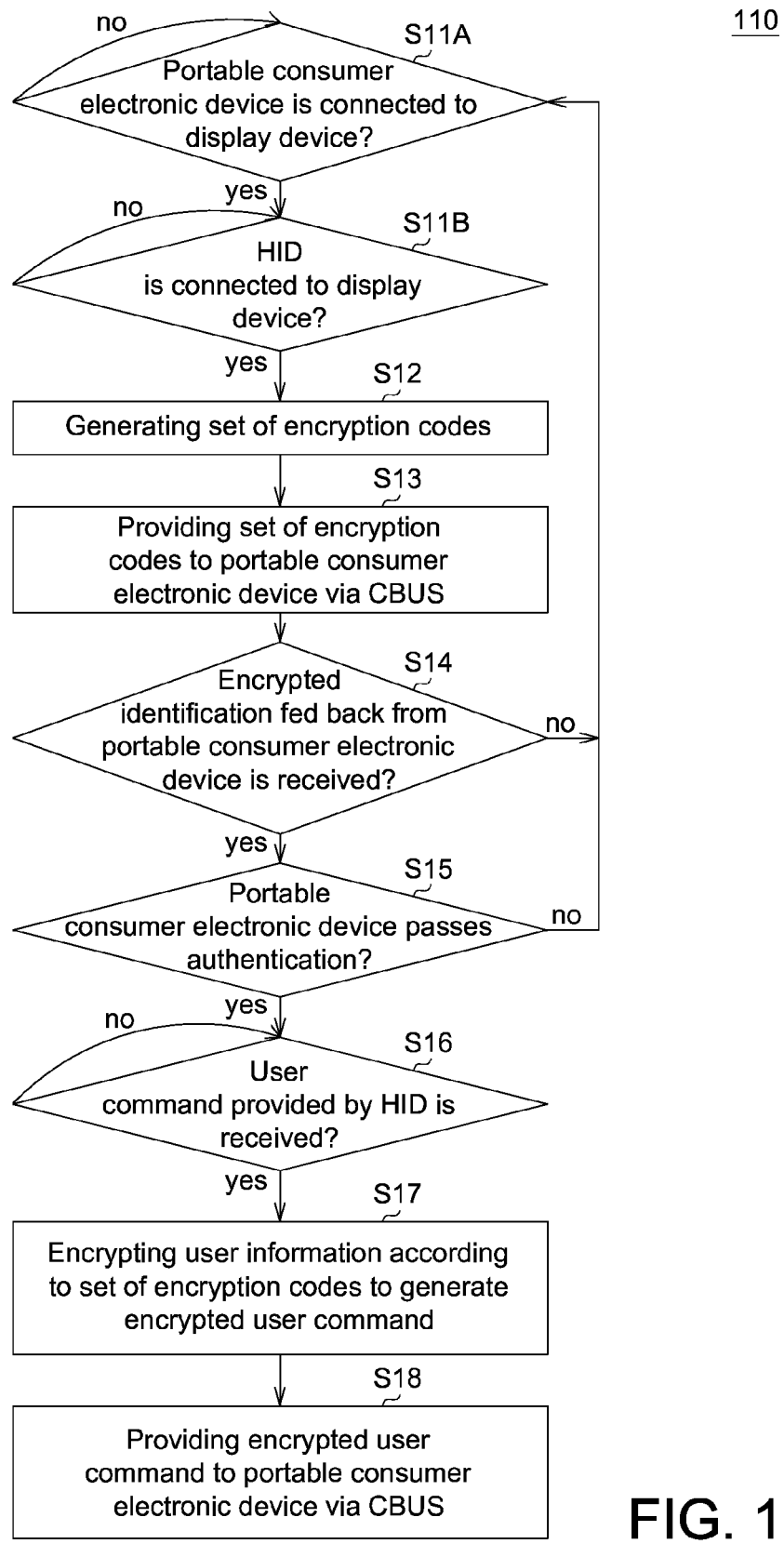
FIG. 1 is a flowchart of a signal processing method according to an embodiment of the present invention.

The drawings in the application include a function block diagram of functional modules associated with one another. It should be noted that, the drawings are not detailed circuit diagrams, and connecting lines therein are representative of signal flows. Interactions of functional elements and/or procedures may be achieved through direct or indirect electrical connections. Further, the functions of the elements need not be allotted as depicted in the drawings, and separate blocks need not be implemented by separate electronic components.

Figure 2:
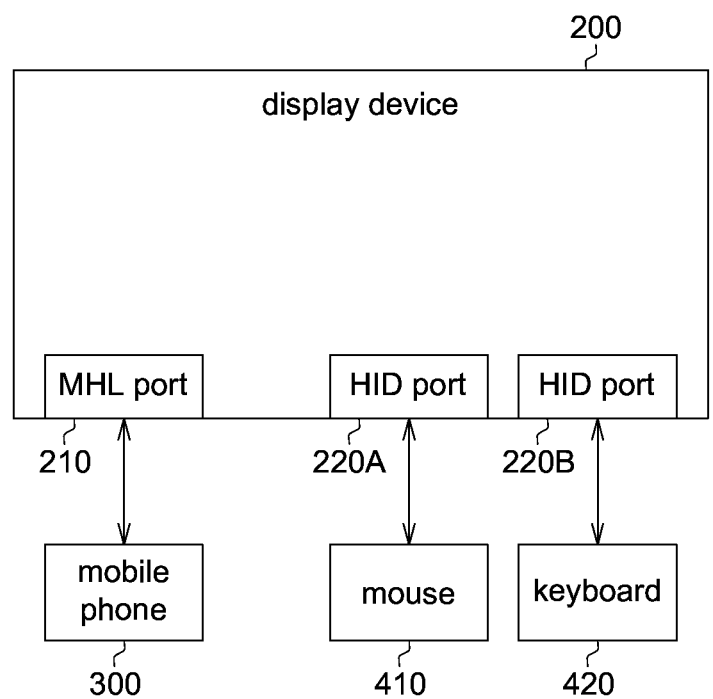
FIG. 2 is an example of connections of a display device and peripheral devices for implementing a concept of the present invention.

FIG. 1 shows a flowchart of a signal processing method for a display device according to an embodiment of the present invention. FIG. 2 shows an example of connections of a display device and peripheral devices for implementing a concept of the present invention. In the example, a display device 200 includes a mobile high-definition link (MHL) port 210, and two human interface device (HID) ports 220A and 220B. In practice, for example, the HID ports 220A and 220B may be universal serial bus (USB). One person having ordinary skill in the art can understand that, the number of MHL ports and HID ports included in the display device 200 are not limited to those shown in FIG. 2. Further, to keep the drawings clear, other possible elements in the display device 200 are not depicted.

The MHL port 210 is feasible to connect with various portable consumer electronic devices compliant to the MHL specification, e.g., mobile phones, tablet computers and handheld game consoles. The HID ports 220A and 220B are feasible to connect to various HIDs, e.g., keyboards, mouse devices, trackballs, touch pads and fingerprint recognition devices. In following embodiments, an exemplary situation that the MHL port 210 is connected to a mobile phone 300, and the HID ports 220A and 220B are respectively connected to a mouse 410 and a keyboard 420, is given for illustrations. In practice, the signal processing method 100 in FIG. 1 may be performed by the display device 200 in a situation that the mobile phone 300 is connected to the display device 200 via the MHL port 210.

In step S11A, it is determined whether a portable consumer electronic device is connected to the MHL port 210. When a determination result of step S11A is negative, step S11A is iterated. Conversely, when the determination result of step S11A is affirmative, step S11B is performed. In step S11B, it is determined whether an HID (e.g., the mouse 410 or the keyboard 420) is connected to the HID port 220A or 220B. When a determination result of step S11B is negative, step S11B is iterated. It should be noted that, steps S11A and S11B may be performed in exchanged sequences or be performed simultaneously. When the determination results of steps S11A and S11B are both affirmative, step S12 is performed to generate a set of encryption codes. In other words, when one portable consumer electronic device is connected to the display device via the MHL port, once it is detected that one HID is also connected to the display device, a set of encryption codes is generated. Similarly, when one HID is connected to the display device, once it is detected that one portable consumer electronic device is also connected to the display device via the MHL port, a set of encryption codes is generated. In one embodiment, multiple encryption methods are predetermined in the mobile phone 300 and the display device, and the set of encryption codes includes an encryption method indication that indicates which one of the encryption methods is to be applied for later communications between the display device 200 and the mobile phone 300 (to be described in detail shortly). In step S13, via a communication bus (CBUS) in the MHL port 210, the set of encryption codes is provided to the mobile phone 300.

Based on the current MHL specification, a main function of the CBUS is to allow the display device 200 to detect a hot-plugging status of the mobile phone 300, and to serve as a channel for the mobile phone 300 to access extended display identification data (EDID) of the display device 200. In an embodiment of the present invention, the display device 200 sends a user command generated by the HID to the mobile phone 300 via the CBUS. The CBUS in the MHL is originally designed to transmit low-speed data (compared to high-speed image data), and is thus quite suitable for transmitting the user command that does not request a high response speed from the HID.

It should be noted that, under certain circumstances, manufacturers of display devices may limit services of the display devices to portable consumer electronic devices with specific partnerships or of specific brands or models, and hence encrypted communications between the devices are required. In an embodiment of the present invention, only portable consumer electronic devices capable of correctly encrypting/decrypting are entitled to the function of "communicating with an HID via a display device" provided by the display device. Thus, the signal processing method 100 is applicable to the following situation. After receiving the set of encryption codes, the portable consumer electronic device supported by the display device 200 encrypts its identification according to the set of encryption codes, and feeds the encrypted identification back to the display device 200 via the CBUS in the MHL port 210.

In step S14, it is determined whether the display device 200 receives the encrypted identification fed back from the mobile phone 300. When a determination result of step S14 is still negative after a reasonable period of wait time, step S11A is iterated. Conversely, the process proceeds to step S15 when the determination result of step S14 is affirmative.

In step S15, it is determined whether the mobile phone 300 passes authentication according to the encrypted identification fed back from the mobile phone 300, i.e., according to whether the mobile phone 300 is a support target of the display device 200. In practice, the display device 200 may decrypt the encrypted identification according to the set of encryption codes, and then determine whether the identification belongs to a portable consumer electronic device to be supported according to the identification (e.g., through a look-up procedure). When a determination result of step S15 is negative, step S11A is iterated. The process proceeds to step S16 when the determination result of step S15 is affirmative.

In step S16, it is determined whether the display device 200 receives a user command from an HID, e.g., new corresponding coordinates that a mouse is moving toward or a word string inputted via a keyboard. For example, the user command may be a command conforming to an HID protocol. When a determination result of step S16 is negative, step S16 is iterated to have the display device 200 enter a state of waiting for a user command from the HID. The process proceeds to step S17 when the determination result of step S16 is affirmative.

In step S17, the user command is encrypted according to the set of encryption codes to generate an encrypted user command compliant to the CBUS specification. In addition to encrypting, step S17 may include rearranging contents of the original user command, such that the encrypted user command may be eight bytes to comply with the current CBUS specification. In step S18, the encrypted user command is provided to the mobile phone 300 via the CBUS in the MHL port 210. Since the mobile phone 300 knows how to decrypt the encrypted user command according to the set of encryption codes, the mobile phone 300 is able to correctly acquire the user command generated by the HID, and to correspondingly respond according to the user command, e.g., to move a cursor in a display image or to display a user-inputted character at a specific position. As such, the user is enabled to control a portable consumer electronic device via an input interface other than the portable consumer electronic device, thereby significantly facilitating operations of the portable consumer electronic device.

The scope of the present invention is not limited to a specific encryption/decryption method. An example of a possible approach is described below. In the example, M encryption methods are predetermined in the mobile phone 300 and the display device 200 (where M is an integer greater than 1), and the set of encryption codes includes encryption method indication. Assume that M is equal to 5. The encryption codes generated in step S12 may include a decoding method index X, which is an integer from 1 to 5 and is determined according to a predetermined rule or randomly determined by the display device 200. For example, when X is equal to 1, it means that the display device 200 adopts the first encryption method among the five encryption methods to communicate with the mobile phone 300. After receiving the index X, the mobile phone 300 may encrypt its identification according to the first encryption method, and feed the encrypted identification back to the display device 200.

As previously stated, each command transmitted via the CBUS is 8 bytes in length. In one embodiment, original contents of all of the eight bytes are encrypted in step S17. In another embodiment, contents of only part of the eight bytes are encrypted in step S17; that is, the contents are partially encrypted.

Figure 3:
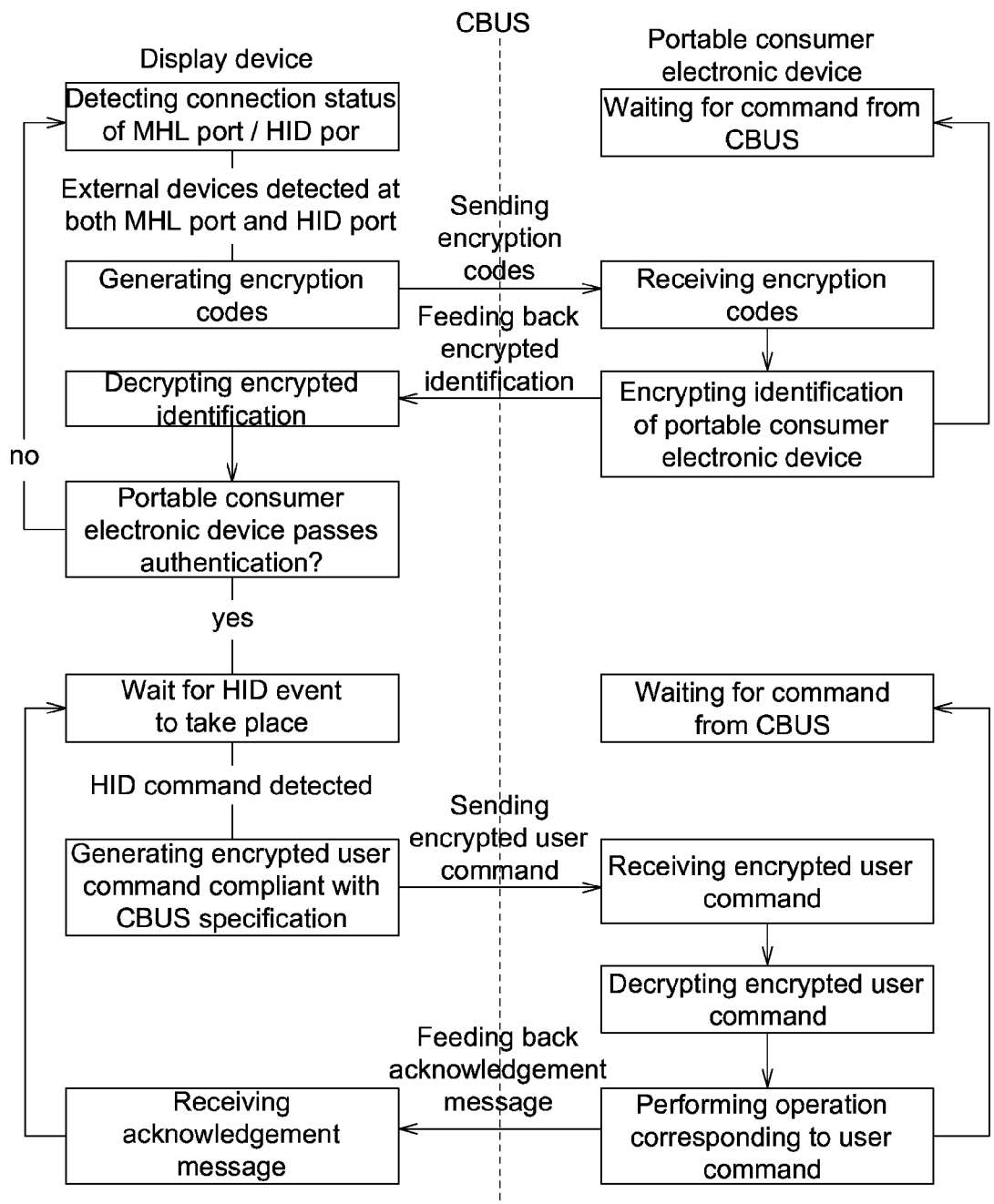
FIG. 3 is a flowchart of bidirectional communications between a display device and a portable consumer electronic device according to an embodiment of the present invention.

FIG. 3 shows a flowchart of bidirectional communications between a display device and a portable consumer electronic device according to an embodiment of the present invention for assisting illustrations of the signal processing method 100 in FIG. 1.

Figure 4:
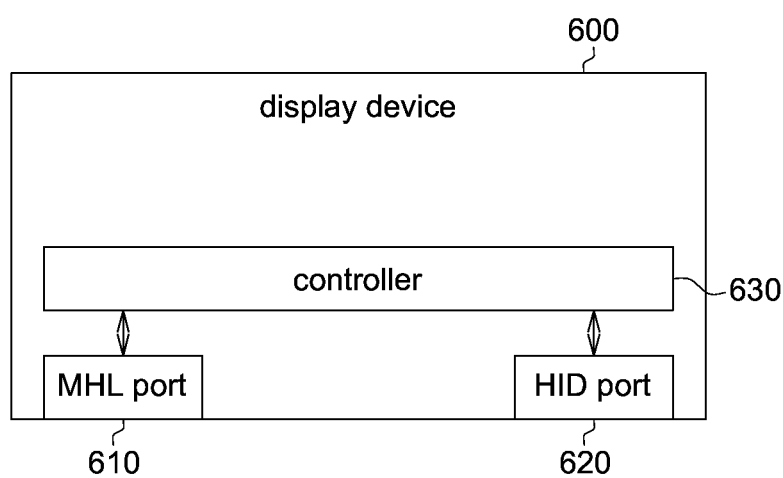
FIG. 4 is a function block diagram of a display device according to an embodiment of the present invention.

FIG. 4 shows a function block diagram of a display device according to another embodiment of the present invention. A display device 600 includes an MHL port 610, an HID port 620 and a controller 630. The MHL port 610 is feasible to connect to a portable consumer electronic device (not show). The HID port 620 is feasible to connect to an HID (not shown). The controller 630 generates a set of encryption codes, and provides the set of encryption codes to a portable consumer electronic device via a CBUS in the MHL port 610. After receiving an encrypted identification fed back from the portable consumer electronic device, the controller 630 determines whether the portable consumer electronic device passes authentication according to the encrypted identification. If the portable consumer electronic device passes the authentication, when an HID provides a user command to the display device 600, the controller 630 encrypts the user command according to the set of encryption codes to generate an encrypted user command compliant with a CBUS specification, and provides the encrypted user command to the portable consumer electronic device via the CBUS in the MHL port 610.

In practice, the controller 630 may be implemented by multiple control and processing platforms, including fixed and/or programmable digital logic circuits, e.g., programmable logic arrays, application-specific integrated circuits, microcontrollers, microprocessor, and digital signal processors. Further, the controller 630 may be designed to complete the foregoing tasks by executing a processor command stored in a memory (not shown). In practice, the controller 630 may be integrated in other circuits of the display device 600, or may exist as an independent unit.

One person having ordinary skill in the art can easily understand that, various operations and modifications in the description associated with the signal processing method 100 are applicable to the display device 600 in FIG. 4, and shall be omitted herein.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal processing method for a display device, the display device being feasible to connect to a human interface device (HID) and a portable consumer electronic device via a mobile high-definition link (MHL) port, the signal processing method comprising:

a) providing a set of encryption codes to the portable consumer electronic device via a communication bus (CBUS) in the MHL port;
b) determining whether the portable consumer electronic device passes authentication according to an encrypted identification fed back from the portable consumer electronic device, wherein the encrypted identification is generated by the portable consumer electronic device according to the set of encryption codes;
c) if the portable consumer electronic device passes the authentication, when the HID provides a user command to the display device, rearranging and encrypting the user command according to the set of encryption codes to generate an encrypted user command compliant with a CBUS specification; and
d) providing the encrypted user command to the portable consumer electronic device via the CBUS in the MHL port, the user command configured to cause the portable consumer electronic device to change what is displayed on a display of the portable consumer electronic device.

2. The signal processing method according to claim 1, before step (a), further comprising:
when the portable consumer electronic device is connected to the display device via the MHL port, if it is detected that the HID is connected to the display device, generating the set of the encryption codes.

3. The signal processing method according to claim 1, wherein the HID is a keyboard, a mouse, a trackball, a touch pad or a fingerprint recognition device.

4. The signal processing method according to claim 1, wherein a plurality of encryption methods are predetermined in the portable consumer electronic device and the display device, the set of encryption codes comprises an encryption method indication, and the encryption method indication indicates which one of the plurality of encryption methods is to be applied for communications between the display device and the portable consumer electronic device.

5. The signal processing method according to claim 1, wherein the encrypted user command comprises a plurality of bytes, which are completely or partially encrypted.

6. A display device, comprising:
a human interface device (HID) port, connectable to an HID;
a mobile high definition link (MHL) port, connectable to a portable consumer electronic device; and
a controller, configured to generate a set of encryption codes and to provide the set of encryption codes to the portable consumer electronic device via a communication bus (CBUS) in the MHL port; after receiving an encrypted identification fed back from the portable consumer electronic device, the controller configured to further determine whether the portable consumer electronic device passes authentication according to the encrypted identification, wherein the encrypted identification is generated by the portable consumer electronic device according to the set of encryption codes; if the portable consumer electronic device passes the authentication, when the HID provides a user command to the display device, the controller configured to further encrypt the user command according to the set of encryption codes to generate an encrypted user command compliant with a CBUS specification; the controller configured to further provide the encrypted user command to the portable consumer electronic device via the CBUS in the MHL port.

7. The display device according to claim 6, wherein when the portable consumer electronic device is connected to the display device via the MHL port, the controller generates the set of encryption codes after having detected that the HID is connected to the display device.

8. The display device according to claim 6, wherein the HID is a keyboard, a mouse, a trackball, a touch pad or a fingerprint recognition device.

9. The display device according to claim 6, wherein a plurality of encryption methods are predetermined in the portable consumer electronic device and the display device, the set of encryption codes comprises an encryption method indication, and the encryption method indication indicates which one of the plurality of encryption methods is to be applied for communications between the display device and the portable consumer electronic device.

10. The display device according to claim 6, wherein the encrypted user command comprises a plurality of bytes, which are completely or partially encrypted.

* * * * *